United States Patent [19]

Jones

[11] Patent Number: 5,712,355
[45] Date of Patent: Jan. 27, 1998

[54] FLUOROMONOMER/FUNCTIONALIZED HYDROCARBON MONOMER COPOLYMERIZATION PROCESS AND COPOLYMER PRODUCT

[75] Inventor: Clay Woodward Jones, Washington, W. Va.

[73] Assignee: E. I. du Pont de Nemours and Company, Wilmington, Del.

[21] Appl. No.: 514,374

[22] Filed: Aug. 11, 1995

Related U.S. Application Data

[63] Continuation-in-part of Ser. No. 383,281, Feb. 3, 1995, abandoned.

[51] Int. Cl.$^6$ ............................................. C08F 14/18
[52] U.S. Cl. ............................................. 526/254
[58] Field of Search ............................................. 526/254

[56] References Cited

U.S. PATENT DOCUMENTS 2,468,664  4/1949  Hanford et al. ..................... 260/86
5,032,656  7/1991  Mares et al. .

FOREIGN PATENT DOCUMENTS

| | | | |
|---|---|---|---|
| 3415975 | 10/1985 | Germany | 526/254 |
| 2-34650 | 2/1990 | Japan | 526/254 |
| 583482 | 12/1946 | United Kingdom . | |

*Primary Examiner*—Joseph L. Schofer
*Assistant Examiner*—N. Sarofim

[57] ABSTRACT

Amorphous copolymer of fluoromonomer, such as tetrafluoroethylene, with vinyl ester, such as vinyl acetate, having a substantially uniform composition is made by aqueous dispersion polymerization by maintaining essentially constant the proportion of the fluoromonomer and vinyl ester copolymerizing with one another. In one embodiment, this proportion consistency is obtained by reducing the agitation rate of the aqueous polymerization medium during the copolymerization reaction at constant fluoromonomer feed pressure within the polymerization reactor.

25 Claims, No Drawings

FLUOROMONOMER/FUNCTIONALIZED HYDROCARBON MONOMER COPOLYMERIZATION PROCESS AND COPOLYMER PRODUCT

This application is a continuation-in-part of Ser. No. 08/383,281, filed Feb. 3, 1995 by the same inventor and now abandoned.

FIELD OF THE INVENTION

This invention relates to the copolymerization of fluoromonomers with hydrocarbon monomers to make copolymers having the attributes of both monomers.

BACKGROUND OF THE INVENTION

Copolymers of fluoromonomers such as tetrafluoroethylene and functionalized hydrocarbon monomers such as vinyl acetate have been made by copolymerization in an organic solvent medium to form a melt-fabricable copolymer product which may or may not be at least partially saponified and may or may not thereafter be crosslinked U.S. Pat. No. 5,032,656 discloses very early attempts (British Patent 583,482 and U.S. Pat. No. 2,486,664) to make such copolymer in an aqueous medium, with the result being a block copolymer, arising frown the difficulty in getting these and similar monomers to copolymerize uniformly. The U.S. Pat. No. '656 patent discloses the preparation of copolymers of more uniform composition through a preferred copolymerization process having the following attributes: (a) water plus an organic co-solvent is used as the polymerization medium, the organic co-solvent disclosed to be miscible with the water and to increase the solubility of the fluoromonomer in the medium, (b) the feed of the fluoromonomer gas to the reaction is such as to keep a constant pressure throughout the duration of the copolymerization reaction, and (c) the copolymerization medium is subjected to a constant rate of agitation throughout the reaction. The possibility of using certain fluorosurfactants is disclosed but not exemplified. The resultant copolymer is disclosed to contain from 40 to 60 mol % of the fluoromonomer and 60 to 40 mol % of the functional hydrocarbon monomer and to be solution and melt processible. The preferred copolymer is disclosed to be the hydrolyzed copolymer in which the ester groups of the copolymer as-made are converted to —OH groups, and this preferred copolymer is disclosed to have good barrier properties by virtue of its crystallinity. The saponified copolymer in this patent has molecular weight which is similar to the as-made copolymer (5.00 X10$^5$ vs. 6.76×10$^5$) as disclosed in Examples 5 and 8.

Copolymer of substantially uniform composition is desired so that the copolymer does not have fluoromonomer, e.g. tetrafluoroethylene, blocks of sufficient length to cause insolubility when the copolymer is added to organic solvent to make a solution of the copolymer. In the event that such domains are present, films made from such solution would not be optically clear. If vinyl ester blocks were present, the copolymer could have poorer thermal stability than if the vinyl ester monomer were uniformly distributed along the polymer chain.

Unfortunately, the co-solvent copolymerization method of the U.S. Pat. No. '656 patent has the disadvantages of being limited to a narrow range of compositions and of the use of the organic co-solvent, which then has to be removed from both the copolymer and the water of the copolymerization medium. Residue of the co-solvent in the copolymer can cause its discoloration when subjected to heat.

SUMMARY OF THE INVENTION

The present invention overcomes this and other disadvantages by the process comprising copolymerizing fluoromonomer of the formula $CF_2=CR_1R_2$, wherein $R_1$ is H, F, or Cl and $R_2$ is H or F, with hydrocarbon toohomer of the formula $CH_2=CHOC(O)R_3$, wherein $R_3$ is an alkyl group containing 1 to 4 carbon atoms, by contacting these monomers with one another in a copolymerization medium consisting essentially of water, polymerization initiator, and surfactant, said copolymerization medium being under pressure provided by said fluoromonomer being in gaseous state, agitating said medium during the resultant copolymerization reaction, maintaining the proportion of said fluoromonomer and said hydrocarbon monomer copolymerizing together during said copolymerization reaction essentially constant throughout the copolymerization reaction, and obtaining as a result thereof an aqueous dispersion of copolymer of substantially uniform composition of said fluoromonomer and said hydrocarbon monomer, said copolymer having ester side groups corresponding to the $—OC(O)CR_3$ groups of said hydrocarbon monomer.

In another embodiment of the present invention, new copolymers are provided, namely comprising 15 to 90 wt % of fluoromonomer of the formula $CF_2=CR_1R_2$, wherein $R_1$ is H, F, or Cl and $R_2$ is H or F, with 85 to 10 wt % of hydrocarbon monomer of the formula $CH_2=CHOC(O)R_3$, wherein $R_3$ is an alkyl group containing 1 to 4 carbon atoms to total 100 wt % of these monomers, said copolymer being amorphous and highly branched as explained hereinafter and thermoplastic but without melt flow through a 2.0955 mm diameter orifice at 215° C. within 10 min., using a 5000 g weight.

Hydrolysis of these copolymers produces the surprising effect that in addition to converting the ester groups of the as-made copolymer to —OH groups, the molecular weight is also greatly reduced so that the saponified copolymer has melt flow so as to be melt fabricable. The preferred saponification agent is ammonium hydroxide, because the residue of this agent and any unreacted agent can be removed from the saponified polymer simply by volatilization, rather than filtration. In another embodiment of this invention, this saponifying agent is used beneficially to saponify any carboxylic-ester functionalized hydrocarbon polymer.

Other embodiments of the present invention will become evident from the disclosure hereinafter.

DETAILED DESCRIPTION

Examples of fluoromonomers that can be used in the copolymerization process of the present invention are tetrafluoroethylene (TFE), chlorotrifluoroethylene (CTFE), and vinylidene fluoride (VF2). Examples of hydrocarbon monomers that can be used in the present invention are vinyl acetate, vinyl propionate, and vinyl butyrate. These monomers have high intrinsic reactivities, with themselves and with other reactive monomers, which means that they tend to react with themselves rather than with the other comonomer and lack physical affinity for domains of the other monomer within the polymerization vessel. For this reason, it is difficult to obtain copolymer of uniform composition of the above-mentioned fluoromonomers and the functional hydrocarbon monomers. The present invention solves this problem without the use of an organic solvent in the copolymerization medium as will be explained hereinafter.

The copolymerization initiator and surfactants used in the present invention can be those which are conventionally used in aqueous dispersion polymerization. Initiators should of course, be selected to be effective at the temperature to be employed. Preferred initiators include compounds such as ammonium persulfate, disuccinic acid peroxide, potassium permanganate, and various redox initiation systems such as potassium permanganate/oxalic acid. The amount of initiator employed will depend at least on the temperature of polymerization, the nature of the initiator, and the molecular weight of the copolymer desired. Thus, the amount will vary depending on the results desired, as known to one skilled in the art. Ordinarily, the amount will be in the range of 2–500 ppm based on the weight of water present.

Examples of surfactants (dispersing agents) include perfluoroalkanoic acids having from 7–20 carbon atoms, preferably 8–10 carbon atoms, and certain salts thereof, especially ammonium salts. Additional examples include the perfluoroalkylethane sulfonic acids and perfluoroalkylbenzene sulfonic acids and salts thereof. The amount of surfactant present is ordinarily from 5 ppm to 10,000 ppm based on the weight of water present. The aforementioned surfactants are anionic; if desired a small amount of nonionic surfactant can be used along with the anionic surfactant.

The copolymerization medium used is water; no organic co-solvent is present. Generally, the copolymerization reaction will be carried out a temperature of 10° C. to 125° C., more often at a temperature of 50° to 100° C.

Any workable pressure can be used in the process. High pressure, accompanied by safety precautions, offers an advantage over low pressure in increased reaction rate. Generally, pressures in the range of 0.2 to 7 MPa can be used, but preferably 0.5 to 3.5 MPa. Pressure is usually controlled by the amount of fluoromonomer, which is in the gaseous state, fed to the reactor.

The process is generally conducted by precharging the water to the reactor, precharging small amounts of initiator and surfactant, deoxygenating, pressuring the reactor with TFE to a predetermined level, agitating, bringing the system to the desired copolymerization temperature, introducing more initiator and then adding the desired proportions of the fluoromonomer and functionalized hydrocarbon monomer to kickoff(start) the copolymerization reaction.

The copolymerization is conducted by maintaining essentially the same proportion of fluoromonomer and functionalized hydrocarbon monomer copolymerizing together in the polymerization reactor throughout the copolymerization reaction, i.e., the proportion of the monomers at the reactive polymerization sites is kept essentially constant throughout the copolymerization reaction. A small variation in relative proportions is tolerable without appreciably adversely affecting the compositional uniformity of the copolymer. The result is substantial uniform distribution of the comonomers along the copolymer chain, i.e., compositional uniformity. This uniformity means that blocks of the fluoromonomer are not present which would form insolubles in organic solvent solutions of the copolymers and saponified copolymer, and films that are optically clear can be made by compression molding or cast from solution. As compared to block copolymer, the copolymers of the present invention can be considered random.

The maintenance of the same proportion of interacting comonomers is accomplished during the reaction by maintaining constant feed rates of the comonomers to the reactor. Maintenance of constant polymerization pressure in the fluoromonomer feed does not maintain a constant feed rate. As the copolymerization proceeds, so does the rate of consumption of the fluoromonomer, with the result of constant pressure being to cause an increase in fluoromonomer feed rate to the reactor.

Various methods are used in accordance with the present invention to maintain essentially the same proportion of monomers interacting at the end of the copolymerization reaction as at its beginning.

One method is to reduce the rate of agitation of the copolymerization medium during the copolymerization reaction. At constant feed rate of fluoromonomer, the reduced agitation causes less fluoromonomer to be consumed in the copolymerization reaction. If the agitation rate were to remain constant as the reaction proceeds, then the proportion of fluoromonomer consumed in the reaction would increase, as would the feed rate of fluoromonomer at constant feed pressure.

The cause of the increase in consumption of the fluoromonomer during the copolymerization reaction, if feed pressure of the fluoromonomer and agitation rate were to stay the same, is believed to come from the increasing surface area of the growing copolymer particles dispersed in the aqueous medium, serving as an increasing area for reactive sites for polymerization.

The original rate of agitation (at the start of copolymerization) is that which is effective to create the dispersion of copolymer particles and encourage the fluoromonomer gas to enter the aqueous medium so as to copolymerize therein; such rate will depend on the reactor used and the method of agitation, e.g. the configuration of a stirrer positioned in the reactor to cause the agitation. The reduction in agitation rate is effective to maintain the proportion of monomers as described above and can be controlled by periodically measuring the fluoromonomer feed rate to the reactor. As the feed rate increases with increasing time of reaction, the rate of agitation is reduced to counteract the increase in feed rate, keeping it relatively constant during the copolymerization reaction. Usually, the reduction in agitation rate will be 10 to 80% of the original agitation rate.

Another method involves reducing the pressure in the reactor during the copolymerization reaction, which has the effect of maintaining the feed rate constant so as to maintain the desired proportion of comonomers interacting together. In this embodiment, the agitation rate can be kept constant and the hydrocarbon toohomer feed rate can be kept constant.

Still another method involves increasing the hydrocarbon feed rate to the reactor during the copolymerization, so that as the consumption of fluoromonomer tends to increase at constant fluoromonomer feed pressure, more hydrocarbon monomer is present to maintain the constant proportion of comonomers interacting with one another. In this embodiment, the fluoromonomer pressurization of the reactor and agitation rate can be kept constant.

Combinations of these embodiments can be used to maintain the desired proportion of comonomers, but the reduction in agitation rate is preferred because of its simplicity.

Additional monomer can be present during the copolymerization reaction whereby the resultant copolymer will contain repeat units of three or more comonomers. The time of addition of one or more additional monomers will depend on their reactivity relative to the other comonomers. For example, hexafluoropropylene (HFP) has such low reactivity that an initial charge of HFP to the reactor may be all that is necessary, with this low reactivity serving to randomly incorporate the HFP into the copolymer. The HFP charge to the reactor may also be an excess over the amount of HFP to be incorporated into the copolymer just to obtain such amount in the copolymer. Other fluoromonomers that might be added as additional monomer to the reactor include the functionalized fluorovinyl ethers, such as $CF_2=CF(OCF_2CF(CF_3))_nOp(CF_2)_mA$ wherein A is $—CH_2OH$ or $—COOH$, p=0 or 1, m=0 to 10, and n=1 to 20, provided that when m=0, p=0 and when n=greater than 0, p=1. Preferred fluorovinyl ethers are $CF_2=CFOCF_2CF(CF_3)OCF_2CF_2CH_2OH$ (EVE-OH) as disclosed in U.S. Pat. No. 4,982,009 and $CF_2=CFOCF_2CF(CF_3)OCF_2CF_2COOH$ (EVE-COOH) disclosed in U.S. Pat. No. 4,138,426.

The affinity of the fluorovinyl ether monomer for the particle surfaces effectively increases their concentration at the reactive sites in proportion to the amount added relative to other monomers and thus it may be desired to add these monomers continuously to the copolymerization reaction for random incorporation into the copolymer. Additional comonomers such as HFP incorporate more fluorine into the copolymer to enhance its fluoropolymer character, such as providing weathering resistance or increasing its oleophobic nature. The fluorovinyl ether comonomers incorporate additional functionality into the copolymer, which can serve as crosslinking sites for the copolymer without the necessity of the subsequent saponification.

The resultant copolymer contains 15 to 90 wt % of the fluoromonomer and complementally to total 100 wt %, 85 to 10 wt % of the functionalized hydrocarbon monomer. As the amount of the fluoromonomer exceeds 90 wt %, the contribution of the functional hydrocarbon monomer to imparting different properties to the copolymer is undesirably diminished. In addition, especially when the fluoromonomer is TFE, it becomes difficult to cast a clear coherent film. Preferred compositions include 15–35 wt % of fluoromonomer for holography applications and 40 to 70 wt % fluoromonomer for coating applications from a solution of the copolymer (after saponification), the balance being the functionalized-hydrocarbon monomer. Thus, the copolymer will preferably contain 15 to 75 wt % of the fluoromonomer and 85 to 25 wt % of the functionalized hydrocarbon monomer. When additional monomer is present, its amount will generally be less than 30 wt %, and more often less than 20 wt %, based on the total wt % of fluoromonomer and hydrocarbon monomer present, and in the case of the functionalized fluorovinyl ether monomers, less than 10 wt %. Reference to monomer content of the copolymer herein means the repeat units derived from the monomers by the copolymerization.

The resultant copolymer in addition to having a substantially uniform composition is also amorphous in the sense that it exhibits a glass transition between 30° C. and 75° C., usually less than 55° C., by DSC and no sharp melting endotherm (DSC analysis) at the melting point of homopolymer of the fluoromonomer component of the copolymer. This absence of sharp melting endotherm, which would be at 327° C. (second-melting) if the fluoromonomer were tetrafluoroethylene, is also an indication of the compositional uniformity of the copolymer, i.e., the hydrocarbon monomer units are interspersed among the fluorovinyl monomer units along the copolymer chain, that blocks of the fluorovinyl monomer units sufficient to exhibit a melting point endotherm and to cause insoluble particles to be present in an otherwise solvent solution of the copolymer are not present..

The copolymer of the present invention is also the thermoplastic but is of such high molecular weight that it exhibits no flow in the melt index test involving the flow of polymer at 215° C. in 10 min. through an orifice of 2.0955 mm in diameter under a weight of 5000 gm using a plastomer in accordance with ASTM D1238. The copolymer is moldable by compression molding into tough articles; films so molded are transparent by virtue of the amorphous nature of the copolymer. Otherwise, the high melt viscosity of the copolymer prevents practical melt processing by such operations as injection molding and extrusion.

The high molecular weight of the copolymer is due to a high degree of branching present in the copolymer. The copolymer can then be saponified, e.g. by slurrying the copolymer in a solvent such as methanol, and reaction therein with a base such as alkali metal hydroxide. Ammonium hydroxide is preferred, however, because the resultant ammonium salt is separable from the saponified copolymer along with the solvent medium by volatilization of the salt and the solvent medium such as by heating the saponified copolymer solution. If the saponifying agent were alkali metal hydroxide, the resultant alkali metal salt could not be removed from the saponified copolymer this way, but would require an additional step, such as filtration to remove the salt. The solvent medium should dissolve at least the saponified copolymer and can be a single solvent or a mixture of liquids which function as solvent; the carboxylic-ester functionalized polymer may only be dispersed in the solvent medium prior to saponification. While alcohols, such as methanol and ethanol are preferred, other solvents can be used such as lower alkyl (1 to 4 carbon atoms) esters of carboxylic acids, e.g. acetate esters such as ethyl acetate. The solvent should have miscibility with a small proportion of water which may be present to dissolve the saponifying agent. The saponification reaction can be conveniently carried out at atmospheric pressure and at a temperature which does not exceed the boiling temperature of the solvent medium. Room temperature (15° C.–20°) can even be used. Use of a closed reaction vessel will keep the $NH_4OH$ from escaping from the vessel. Elevated pressure may also be used especially at elevated temperatures. The $NH_4OH$ may be formed in situ by adding ammonia gas to the solvent medium which contains a small proportion of water sufficient to take the gas into solution.

The saponification reaction cleaves ester groups pendant from the copolymer chains, replacing them with $—OH$ groups. The resulting solution contains a saponified polymer of greatly reduced molecular weight relative to the original polymer.

It is surprising that the saponification reaction also greatly reduces the molecular weight of the copolymer so that it becomes melt fabricable by extrusion and injection molding and exhibits a melt flow in the ASTM D1238 test and lower melt creep viscosity. The as-made copolymer is believed to have a dendritic configuration formed during the copolymerization reaction by radical abstraction of hydrogen atoms alpha, beta, or gamma from the ester carbonyl carbon, followed by propagation of the resultant radical to form long chain copolymer branches. The saponification reaction cleaves these branch points by the hydrolysis of the ester linkages, but is otherwise generally unreactive to the other chemical structures of the copolymer, except for hydrolysis of the ester groups. In Gel permeation chromatography (GPC) analysis of the copolymer before and after saponification, the molecular weight so indicated decreases at least 10-fold. Before saponification the GPC determined weight average molecular weight exceeds $1\times10^6$; for the copolymer of Example V, the weight average molecular weight exceeded $16\times10^6$. The degree of saponification and the degree of molecular weight reduction depends on the reaction conditions and amount and nature of the base added. Preferably at least 30% of the ester groups are saponified. The weight average molecular weight of the copolymer will be dependent on the extent of saponification but will generally be from 5,000 to 150,000 and more often from 10,000 to 100,000. The saponification reaction has no effect on the EVE-OH or EVE-COOH monomer units if present in the copolymer, except that at pH's of the solution which are higher than strong acid, the EVE-COOH will be converted to a salt, e.g., ammonium if ammonium hydroxide is used.

The saponified copolymer contains hydroxyl functionality which are sites for crosslinking of the copolymer by using known crosslinking agents (with known catalysts) such as diisocyanates which react with —OH groups pendant from copolymer chains, to form urethane bridges (connectors) between copolymer chains. As an alternative to saponification, EVE-OH comonomer can provide crosslinking sites. Prior to crosslinking the saponified copolymers of the present invention are soluble in such organic solvents as ethanol, methyl ethyl ketone, and butyl acetate at room temperature to form clear solutions which are convenient for application to thermally resistant substrates, and if crosslinking agent is present, to crosslink the coating. Examples of substrates are glass, metal, and plastics. The presence of the fluorine in the copolymer provides weatherability to the coatings and the presence of excess —OH groups provides hydrophilicity, even though the fluorine groups with hydrophobic character are present. The weight proportion of the hydrocarbon toohomer content of the saponified copolymer diminishes, as compared to the as-polymerized copolymer because the resultant vinyl alcohol monomer units have a lower molecular weight than the ester groups present in the starting hydrocarbon monomer; the composition of the as-made copolymer, however, is applicable to the saponified polymer when the vinyl alcohol units are described in terms of being derived from the ester units of indicated concentration in the copolymer.

In another embodiment of the present invention, the preferred saponification agent, ammonium hydroxide, can be used on carboxylic-ester functionalized polymers other than the copolymers of the present invention, following the same general procedure described above with respect to the saponification of copolymers of the present invention. An example of such other polymers includes polyvinylacetate. Such polymers after saponification have utility as coating compositions, which can be crosslinked in the manner similar to the saponified copolymers of the present invention, to modify or protect the substrate being coated. Polyvinylacetate, after saponification, can be reacted with aldehydes such as butyraldehyde to form the interlayer for automobile windshields.

EXAMPLES

Example I

Example I illustrates the copolymerization of a TFE and vinyl acetate in a fully aqueous medium to give a homogeneous copolymer in the form of a stable colloidal dispersion. To a 1 gallon (0.004 $m^3$) horizontal autoclave which has been cleaned by boiling water with ammonium persulfate (APS) and a surfactant such as ammonium perfluorocaprylate (C-8), was charged 1900 ml of demineralized water, 0.1 g of succinic acid, and 10 ml of a 20 wt % C-8 solution. Agitation was begun at 100 rpm. The aqueous charge was heated to 65° C. and deairated by drawing a vacuum on the autoclave, introducing TFE to 30 psig (0.31 MPa), and subsequently drawing vacuum and repressuring with TFE twice more. The autoclave was evacuated and ethane introduced to give a pressure rise of 8 inches (20.32 cm) Hg. The temperature was brought to 80° C. and TFE was added to give 250 psig (1.83 MPa). Fifty ml of vinyl acetate was pumped into the autoclave which typically increased the pressure 10 psig (0.069 MPa) or more. The agitation rate was held at 100 rpm. The polymerization was initiated by pumping 20 ml of an aqueous APS solution of 2 g/l. at 5 ml/min. which was reduced to 0.5 ml/min once the initial 20 ml had been introduced. Once the pressure of the autoclave had dropped 10 to 15 psig (0.069 to 0.16 MPa), vinyl acetate was pumped at 4 ml/min and the agitation rate was varied to allow added TFE to be consumed at the rate of 0.005 lb/min (2.27 g/rain) while maintaining 250 psig (1.83 MPa) pressure. This was accomplished by monitoring the TFE feed rate and, as it increased with increasing polymerization time, reducing the agitation rate sufficiently to return the TFE feed rate to 0.005 lb/rain (2.27 g/min). In this Example, the average agitation rates during successive 10 min periods were 83, 77, 67, 64, 67, 71, 72, 67, 61 and 60 rpm at the end of the copolymerization reaction. The increase in agitation rate during the period of 50-70 rain into the reaction was caused by reducing the agitation slightly too much during earlier periods. Once 0.5 lbs (227 g) of TFE had been transferred to the autoclave after the initial pressuring step, the agitator and ingredient feeds were stopped. Obtained was an aqueous dispersion weighing 2377 g containing 26.5 wt % polymer solids. To isolate the polymer, to 200 ml of the dispersion diluted with 200 ml of water, was added with stirring 25 ml of a solution of 4.5 g of cetyl trimetylammonium bromide/1 liter of water. Mild agitation served to coagulate the polymer from this mixture. The coagulated polymer was filtered, redispersed in water, filtered, and dried at room temperature. The dried polymer tended to be chunky but was easily ground with mortar and pestle to a fine powder. The polymer was found to have a composition of 67.6 wt % vinyl acetate and the balance being TFE. The copolymer was thermoplastic but exhibited no melt flow at 215° C. (ASTM D1238).

Examples II–VII

Examples II–V illustrate that the composition of the polymer can be controlled by means of the rate at which TFE is fed to the autoclave which in turn is controlled by the agitation speed. The agitation speed invariably was the fastest at the beginning of the batch and was reduced through the course of the batch to obtain a constant rate of TFE feed through the batch. In these examples the amount of the surfactant, the nature of the surfactant, and the manner in which the surfactant was introduced whether before or after the deairation step or added continuously through the polymerization was varied. The TFE pressure and initiator amount and type and the polymerization temperature was also varied. Small changes in the amount of the aqueous charge of about 10% were made. Zonyl® TBS fluorosurfactant used in Example V is a mixture of $C_6$ to $C_{16}$ perfluoroalkylethane sulfonic acid, the alkyl group having an average chain length of about 8 carbon atoms. In example VI, a 100 mg/ml aqueous solution of 9-carboxy-perfluoro (3,5-dioxa-5-methyl-1-nonene) (EVE-COOH) was prepared by the stoichiometric addition of ammonium hydroxide and added with the C-8 surfactant and continuously added as well. In example VII, 9-hydroxy-perfuoro(3,5-dioxa-5-methyl-1-nonene) (EVE-OH) was continuously added. Otherwise for these Examples conditions were the same as Example I.

|  | Ex. II | Ex. II | Ex. IV | Ex. V | Ex. VI | Ex. VII |
| --- | --- | --- | --- | --- | --- | --- |
| Initiator Type | APS | APS | KMnO4 redox | APS | APS | APS |
| Initiator Amount mg | 140 | 140 | 150 | 350 | 90 | 140 |
| TFE, MPa | 0.79 | 1.48 | 1.48 | 1.48 | 1.48 | 1.48 |
| TFE rate, lb/min | .005 | .0025 | .01 | .005 | .003 | .005 |
| Time (min from kickoff) | 100 | 100 | 100 | 150 | 50 | 100 |
| Surfactant Type | C-8 | C-8 | C-8 | Zonyl® TBS | C-8 | C-8 |
| Surfactant Amount g | 2 | 2 | 2 | 4 | 2 | 4 |
| Surf. add before or after deairation, and/or continuous add | before | after | before | after, cont. | after | after |
| Temp. °C. | 80 | 80 | 60 | 80 | 80 | 80 |
| Solids, wt % | 32.7 | 26.7 | 23.0 | 34.4 | 17.1 | 28.0 |
| Agitation rate (rpm) at beginning | 150 | 100 | 110 | 100 | 100 | 170 |
| Agitation rate (rpm) at end | 70 | 64 | 75 | 77 | 65 | 60 |
| Vinyl acetate, wt % in copolymer | 64.9 | 74.6 | 38.6 | 64.2 | 71.2 | 51.1 |
| Melt Creep[1] Viscosity at 55° C. | — | — | $17 \times 10^9$ | $9.8 \times 10^9$ | — | — |
| EVE-COOH, g | — | — | — | — | 21 | — |
| EVE-OH, ml | — | — | — | — | — | 40 |

[1]The melt creep viscosity for the copolymer of Examples II, III, VI, and VIII fell between those of Examples IV and V. Melt creep viscosity is measured at a temperature above the Tg of the copolymer using a Thermal Mechanical Analyzer 2940, equipped with a parallel plate rheometer, from TA Instrument and the procedure described in its operations manual, pp 6–33 to 6–54.

Example VIII

This example illustrates the addition of a gaseous termonomer. To the prepared and deairated 1-gallon (0.004 m$^3$) autoclave containing 1700 ml of water was added 20 ml of a 20 wt % C-8 solution. With agitation at 100 rpm the aqueous charge was heated to 75° C. Hexafluoropropylene (HFP) was added to give 160 psig (1.21 MPa). TFE was added to give 200 psig (1.38 MPa) total pressure. Fifty ml of vinyl acetate was pumped. One hundred ml of an initiator solution of 2 g/l of APS was pumped at 5 ml/min and more initiator solution was pumped at 0.5 ml/min thereafter. Once the pressure had dropped 10 psig (0.069 MPa), vinyl acetate was added at 4 ml/min. The pressure was maintained at 200 psig (1.48 MPa) by the addition of TFE at the rate of 0.005 lb/min (2.27 g/min) which was maintained by varying the agitation speed. When 0.5 lb (227 g) of TFE had been added, the agitator and ingredient feeds were stopped; the agitation rate at the end of the reaction was 70 rpm. 2550 g of a stable colloidal dispersion of 27.3 wt % solids was obtained. The average dispersion particle diameter was 117 nm. The copolymer was found to contain 32.4 wt % TFE, 45.0 wt % vinyl acetate, and 22.6 wt % HFP.

Example IX

This example illustrates the use of reducing pressure to control the rate of fluoromonomer consumed. To the prepared and deairated 1-gallon (0.004 m$^3$) autoclave containing 1700 ml of water was added 20 ml of a 20 wt % C-8 solution. With the agitation speed set at 150 rpm, the aqueous charge was heated to 75° C. TFE was added to give 200 psig (1.48 MPa) and 50 ml of vinyl acetate was pumped. Forty ml of an initiator solution of 2 g/l of APS was pumped at 5 ml/min and more initiator solution was pumped at 0.5 ml/min thereafter. The pressure was decreased to give a consumption of 0.005 lb/min (2.27 g/min). The pressure of the autoclave fell from 216 psig (1.59 MPa) to 200 psig (1.48 MPa) at 12 minutes after the start of the initiator feed.

At this point TFE feed began and vinyl acetate was pumped at 4 ml/min. The pressure at 10 minute intervals from the point of TFE feed start was 171, 140, 108, 97, 56, 48, 43, 44, 41 psig (1.28, 1.1, 0.84, 0.77, 0.49, 0.43, 0.40, 0.41, and 0.38 MPa, respectively). Ninety-five minutes after the TFE feed began the copolymerization reaction was ended, to give 2505 g of a 27.7 wt % solids dispersion. The average dispersion particle diameter was 147 mn and the copolymer was thermoplastic but had no melt flow at 215° C. (ASTM D1238). The copolymer was found to contain 57.1 wt % vinyl acetate, the remainder being TFE.

Example X

To 35 g of the dried polymer of Example IV was added 250 ml of methanol and 5 ml of concentrated ammonium hydroxide (28-30 wt % NH$_3$ in water). After 2 weeks at room temperature a clear solution was obtained. Moderate heating in an Erlenmeyer flask removed the byproducts of the saponification reaction, ammonia and methyl acetate, and once the temperature of the distillate reached 65° C., methanol was removed. After a period, heating was stopped and the product remaining was a nearly colorless, clear solution of the partially saponified (46% of the total ester group) copolymer in methanol, which did not require filtering, of 16 wt % dissolved solids and did not require any decolorizing agent. Evaporation of the methanol at 50° C. in a vacuum oven yielded an amorphous, clear, colorless copolymer. The melt creep viscosity at 55° C. determined by parallel plate viscometry was 7.4×10$^7$ poise. The melt flow determined at 215° C. was 0.605 g/10 rain (ASTM D1238).

Example XI 160 g of dried TFE/vinyl acetate copolymer containing about 65 wt % of vinyl acetate, made by the technique of Examples I through V, was placed into a 1-gallon (0.004 m$^3$) horizontal autoclave. 1600 ml of methanol was added and the mixture was agitated at 50 μm for 5 min. 45 ml of concentrated ammonium hydroxide was added. The temperature was raised to 95° C. and agitated for 90 minutes. The autoclave was cooled and the saponified copolymer solution was discharged. 200 ml of methanol as a rinse was added to the autoclave and agitated for 5 minutes. The resulting solution was added to the solution already collected. The product solution was nearly colorless (not requiring any decolorizing agent) and did not require filtering. This solution was heated to remove the byproducts of the reaction and water to give a methanolic solution of the saponified copolymer of 26.6 wt % dissolved copolymer solids. The copolymer was 75% saponified and was amorphous and melt fabricable.

Example XII

To 1 g of the solution of Example XI were added 0.2 g of a 24 wt % methanolic solution of Vestanat® B-1358/100 (an oxime blocked isophronediisocyanate trimer available frown Huls America Inc.) crosslinking agent, 0.05 g of dibutyltin diacetate catalyst, and 0.05 g of ethanol. After mixing, this solution was spread on a glass microscope slide and allowed to drain. The solvent was allowed to evaporate for 30 min. and then the coating was cured at 150° C. for one hour. The resulting coating was optically clear and showed good adhesion.

Example XIII

To 10 g of the solution of Example XI were added 0.5 g of a 18 wt % solution of Vestantat® B-1358/100 in isopropanol, and 0.16 g of dibutyltin diacetate catalyst. After mixing, the solution was spread onto a chromate-pretreated aluminum sheet (0.51 mm wet film thickness), the solvent allowed to evaporate at 50° C. in a vacuum oven overnight, and the coating cured at 150° C. for one hour. The resulting coating of 0.05 mm dry film thickness passed the crosshatch test ASTM D3359 (Cross Hatch Adhesion Test) for adhesion and only 0.2 mm were removed by dropping 25 liters of sand onto the crosslinked film according to the ASTM D968 abrasion resistance test, the use of 25 liters of sand in the ASTM test procedure herein being referred to as the Abrasion Test.

Example XIV

To 0.5 g of the copolymer of Example I were added 20 ml of tetrahydrofuran. After sitting overnight there was obtained a clear solution. The solution was evaporated to give a clear film whose index of refraction was found to be 1.4292.

While in Example XIII, only 0.2 mm thickness of the coating was removed in the Abrasion Test, greater abrasion resistance may be desired for particular utilities. This greater abrasion resistance, however, should not be at the expense of reduced adhesion of the coating to the substrate. Unfortunately, as adhesion increases, abrasion resistance, a measure of coating toughness decreases.

In accordance with another embodiment of the present invention, it has been found that both high adhesion and high abrasion resistance of the coating containing the saponified copolymer can be obtained. More specifically the present invention provides substrate coating that passes the Cross Hatch Adhesion Test (Example XIII) insofar as adhesion is concerned and exhibits a coating thickness loss of less than 0.18 mm, preferably less than 0.15 mm in the Abrasion Test (Example XIII). Adhesion and toughness can be promoted by the composition of the copolymer. The greater the degree of saponification, the more the OH groups are present to promote adhesion to the substrate. Curing of the copolymer, with crosslinking agent, tends to toughen the copolymer, but reduce adhesion. The amount of curing agent, therefore, for a given level of saponification can affect adhesion and toughness. In accordance with this embodiment of the present invention, the combination of high adhesion and high toughness is achieved by a multiple coating of the same single copolymer composition and degree of saponification. The crosslinking agent used in the first layer of the saponified copolymer coated onto the substrate, i.e., the primer layer, promotes adhesion. The subsequent layer, or topcoat, coated onto the primer-coated substrate contains a different crosslinking agent, one which promotes toughness. It has been found that difunctional crosslinking agents, such as diisocyanates favor high adhesion, and this type of crosslinking agent would be used in the coating composition for the primer layer. The Abrasion Test result for such primer layer is generally a loss of 0.2 mm of layer thickness or greater. Polyfunctional crosslinking agents (three or more crosslinking sites) such as melamines promote greater toughness, at the expense of adhesion to a substrate, of the topcoat layer, this greater thickness being characterized by a loss in thickness of less than 0.18 mm in the Abrasion Test. The layers on the substrate are sequentially applied to the substrate from the liquid coating compositions containing saponified copolymer and crosslinking agent and dried between coatings. A single baking step may be used to cure all the layers. Adhesion between layers is as good as adhesion to the substrate. The topcoat layer will be bonded to the primer layer either directly or indirectly, if an intermediate layer of cured saponified copolymer is present. This embodiment is the subject of Example XV.

Example XV

Primer and top coat formulations were each prepared by use of an acetone solution of 25 wt % of partially saponified TFE/vinyl acetate copolymer of approximate composition: vinyl acetate 72 wt % and TFE 28 wt %. Approximately one-half of the acetate groups were saponified. To formulate the primer the following ingredients were added to 20 grams of the solution:

| Tripropyl amine | 0.05 g |
|---|---|
| Dibutyl tin diacetate | 0.05 g |
| Acetone | 8.0 g |
| Desmadure ® BL-3175A | 2.4 g |

(blocked hexamethylenediisocyanate from Mobay Chemical)

To formulate the topcoat the following ingredients were added to 20 grams of the solution:

| Acetone | 1.4 g |
|---|---|
| Cymel ® 303 (hexamethoxymethyl melamine) | 0.24 g |
| Cycat ® 600 (dodecylbenzene sulfuric acid) | 0.02 g |

The primer solution was spread onto a chromate pretreated aluminum sheet (0.51 mm wet film thickness) and air dried. The topcoat solution was spread over the primer to the same thickness and also air dried. Curing was effected at 240° C. for 1 min. The coating retained adhesion after 24 hr in boiling water, passing the Cross Hatch Adhesion Test, and the Abrasion Resistance Test showed only 0.125 mm thickness removed. The topcoat formulation without pruner failed both boiling water and Cross Hatch Adhesion Tests but was superior to the primer in abrasion resistance.

In another embodiment of the present invention, it has been found that a high proportion of HFP comonomer a long with TFE and vinyl acetate in the copolymer enables a solution of high solids (dissolved) content for the saponified copolymer to be made in such common solvent as methanol at room temperature. This is achievable with both difunctional and polyfunctional crosslinking agents. Preferred copolymer compositions in this regard are as follows: TFE 15 to 65 wt %, HFP 10 to 30 wt %, and vinyl acetate 25 to 85 wt % to total 100 wt % of the sum of these components. The degree of saponification can be as described hereinbefore.

Solutions of at least 40 wt % of the saponified copolymer in solvent can be made. The high dissolved copolymer content of the solution provides a coating composition which yields relatively thick layers by single-pass coating and minimizes the amount of solvent to be recovered in the drying step for the layer. The high dissolved copolymer content of the solution also increases the viscosity of the solution, which can be undesirably high at dissolved copolymer contents exceeding 65 wt % based on the weight of copolymer plus solvent.

This embodiment is illustrated by Example XVI.

Example XVI

The conditions of Example VIII were repeated except that ethane was introduced into the evacuated autoclave to give 8 inches (20.32 cm) Hg, the initiator solution pumping rate after kickoff was increased to 1 ml/min, the TFE feed rate was reduced to 0.025 lb/min (11.3.2 mm) and the batch extended to 200 min. in length. 2990 ml of a stable colloid dispersion of 34.8 wt % polymer solids was obtained of average particle size of 153 nm. To 100 g of the isolated, dried polymer were added 500 ml of methanol and 40 ml of concentrated ammonium hydroxide. After several days at room temperature with occasional shaking, the resulting solution was heated to removed the reaction by-products and there was obtained a tan methanolic solution of 54.8 wt % of melt fabricable polymer solids of composition 3.8 wt % vinyl acetate, 38.1 wt % vinyl alcohol, 32.2 wt % TFE, and 25.9 wt % HFP.

Example XVII

This Example shows the preparation of high TFE content copolymer. The conditions of Example III were repeated except that a total of 470 mg of APS was added, the TFE addition rate was 0.01 lb/rain (4.5 g/min), the vinyl acetate addition rate was 2 ml/min., and the final agitation rate was 80 rpm. 2580 g of a 25.0 wt % solids colloidal dispersion was obtained. To 100 g of the isolated, dried polymer was added 500 ml of methanol and 40 ml of concentrated ammonium hydroxide. After several weeks at room temperature with occasional shaking, the resulting solution was heated to remove the reaction by-products and there was obtained a hazy, viscous solution of 19 wt % solids of approximate composition 82 wt % TFE, 16 wt % vinyl alcohol, and 2 wt % vinyl acetate. Upon evaporation of the solvent at 50° C. in a vacuum oven for one day, a clear, somewhat rubbery melt fabricable polymer was obtained.

In accordance with another embodiment of the present invention, it has been found that when acetate solvent is used as the liquid medium instead of other solvents such as methanol in the saponification reaction, the branch points of the copolymer can be cleaved without removing a major proportion of the acetate functional groups, to convert the copolymer to one which is melt-fabricable. This embodiment is shown in Example XVIII.

Example XVIII

To 100 g of a copolymer made by the process of the present invention and having the composition 55.8 wt % vinyl acetate, 32.8 wt % TFE and 11.4 wt % HFP, was added 500 ml of methanol and 40 ml of concentrated ammonium hydroxide to form a copolymer suspension in the methanol. After three days at room temperature with occasional shaking, the resulting solution was heated to remove the reaction by-products to give a 25.1 wt % solution of polymer of composition 2.7 wt % vinyl acetate, 37.4 wt % vinyl alcohol, 44.5 wt % TFE, and 15.4 wt % HFP.

To 100 g of the same copolymer was added 1500 ml of ethyl acetate, 40 ml of concentrated ammonium hydroxide and 40 ml of water. After two days with stirring, the polymer dissolved to give a gel. During the next three weeks at room temperature, a progressive decrease in viscosity of the solution was noted. At this time the solution was heated to remove ammonia, giving a partially saponified polymer of composition 32.4 wt % vinyl acetate, 16.4 wt % vinyl alcohol, 38 wt % TFE, and 13.2 wt % HFP in a 27.4 wt % solids solution in ethyl acetate.

Each of the copolymers saponified in this Example became melt-fabricable. The copolymer saponified in an ethyl acetate medium achieved the melt fabricability with a relatively small amount of saponification.

What is claimed is:

1. Copolymer comprising 15 to 90 wt % of fluoromonomer of the formula $CF_2=CR_1R_2$, wherein $R_1$ is H, F, or Cl and $R_2$ is H or F, with 85 to 10 wt % of hydrocarbon monomer of the formula $CH_2=CHOC(O)R_3$ wherein $R_3$ is an alkyl group containing 1 to 4 carbon atoms, to total 100 wt % of these monomers, said copolymer being amorphous and highly branched as indicated by said copolymer being thermoplastic but without melt flow through a 2.0955 mm diameter orifice at 215° C. within 10 min., using a 5000 g weight, said copolymer being made by aqueous dispersion polymerization in water and in the absence of organic co-solvent.

2. Copolymer of claim 1 wherein said fluoromonomer is tetrafluoroethylene and said hydrocarbon monomer is vinyl acetate.

3. Copolymer of claim 2 wherein said copolymer contains hexafluoropropylene as additional comonomer.

4. Copolymer of claim 2 wherein said copolymer contains functionalized fluorovinyl ether as additional monomer.

5. Copolymer of claim 4 wherein said copolymer contains up to 10 wt % of EVE-COOH or EVE-OH based on the total weight of said fluoromonomer and said hydrocarbon monomer.

6. Copolymer of claim 1 at least partially saponified.

7. Copolymer of claim 4 being amorphous.

8. Copolymer of claim 6 crosslinked.

9. Solution of said copolymer of claim 1 in organic solvent.

10. Solution of said copolymer of claim 6 in organic solvent.

11. Solution of claim 10 wherein said copolymer contains crosslinking agent.

12. Solution of the copolymer of claim 3 containing at least 40 wt % of said copolymer based on the weight of said copolymer plus the solvent in which the copolymer is dissolved.

13. An article having a substrate and a coating thereon, said coating comprising the copolymer of claim 1.

14. An article having a substrate and a coating thereon, said coating comprising the copolymer of claim 6.

15. An article having a substrate and a coating thereon, said coating comprising the copolymer of claim 8.

16. The article of claim 8 wherein said coating comprises a primer layer and a topcoat layer, said prime layer passing the Cross Hatch Adhesion Test and said topcoat layer exhibiting removal of less than 0.18 mm of layer thickness in the Abrasion Test.

17. The article of claim 16, wherein the primer layer is crosslinked using difunctional crosslinking agent and the topcoate layer is crosslinked using polyfunctional crosslinking agent.

18. Copolymer comprising 15 to 90 wt % of fluoromonomer of the formula $CF_2=CR_1R_2$, wherein $R_1$ is H, F, or Cl and $R_2$ is H or F, with 85 to 10 wt % of hydrocarbon monomer of the formula $CH_2=CHOC(O)R_3$, wherein $R_3$ is an alkyl group containing 1 to 4 carbon atoms, to total 100 wt % of these monomers, said copolymer being amorphous, highly branched, and having a weight average molecular weight greater than 1,000,000, said copolymer being made by aqueous dispersion polymerization in water and in the absence of organic co-solvent.

19. The copolymer of claim 18 at least partially saponified.

20. The copolymer of claim 19 crosslinked.

21. The copolymer of claim 18 in the form of an dispersion in water.

22. The copolymer of claim 1 in the form of an dispersion in water.

23. The copolymer of claim 1 wherein said fluoromonomer is tetrafluoroethylene or chlorotrifluoroethylene.

24. The copolymer of claim 18 wherein the amount of said fluoromonomer in said copolymer is 15 to 35 wt %.

25. The copolymer of claim 18 wherein the amount of said fluoromonomer in said copolymer is 40 to 70 wt %.

* * * * *